United States Patent [19]

Serata

[11] 4,094,189

[45] June 13, 1978

[54] MICRO-CREEPMETER

[76] Inventor: Shosei Serata, 1229 8th St., Berkeley, Calif. 94710

[21] Appl. No.: 780,800

[22] Filed: Mar. 24, 1977

[51] Int. Cl.² ............................................. G01B 7/16
[52] U.S. Cl. .................................... 73/88 E; 33/1 H
[58] Field of Search ............... 73/88 E; 116/DIG. 34; 33/1 H, 125 B, 147 D

[56] References Cited

U.S. PATENT DOCUMENTS

| 3,082,621 | 3/1963 | Soderholm | 73/88 R |
| 3,562,916 | 2/1973 | Duckworth | 73/88 E X |
| 3,828,435 | 8/1974 | Baker | 33/125 B X |

OTHER PUBLICATIONS

Technology News from the Bureau of Mines, "Horizontal Roof Strain Indicator (HORSI)," Dec. 1976.

Primary Examiner—Charles A. Ruehl
Attorney, Agent, or Firm—Harris Zimmerman

[57] ABSTRACT

This instrument is a portable field device that quickly determines microscopic creep velocity by measuring relative displacement between two objects connected by a metal wire. The device consists of a micro-creepmeter probe and recorder. The probe includes a linear variable differential transformer disposed within a cylindrical housing which is secured to one of the objects with a multi-directional ball joint fitting. An extendable piston rod slidably disposed within the housing is secured to the other object by means of a dual wire arrangement, which is also used to electronically compensate for temperature effects from solar radiation and variable wind. The transformer core is attached to the inner end of the piston rod and is translated axially by the piston rod through the sensing field of the linear variable differential transformer. A pair of linear ball bearings holds the piston rod free from axial friction within the cylindrical housing. The piston rod is also held free from rotary friction effects by use of rotary ball bearings at both ends. The freely moving piston rod is made water and dust proof by a special arrangement of O-rings, flexible bellows and environmentally sealed rotary ball bearings. The output signal of the friction-free microcreep displacement from the probe is fed into a portable electronic recorder which gives a direct microcreep velocity reading in terms of $10^{-6}$ inches per minute.

9 Claims, 3 Drawing Figures

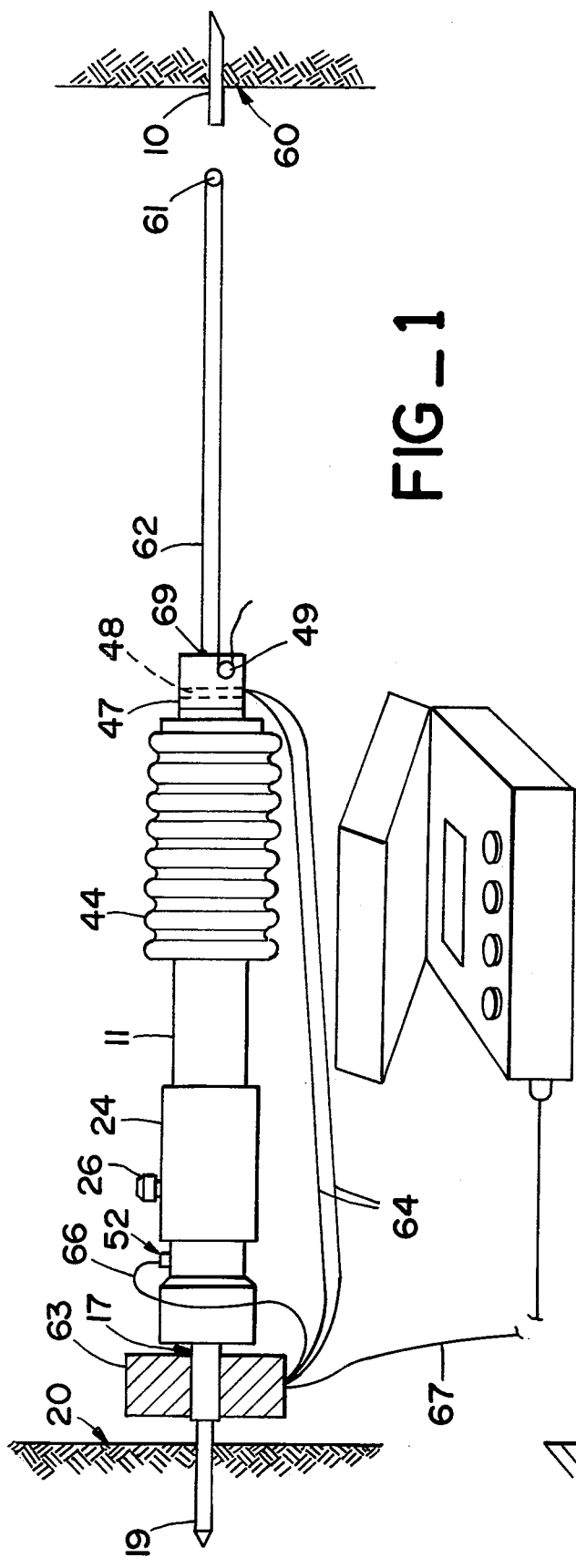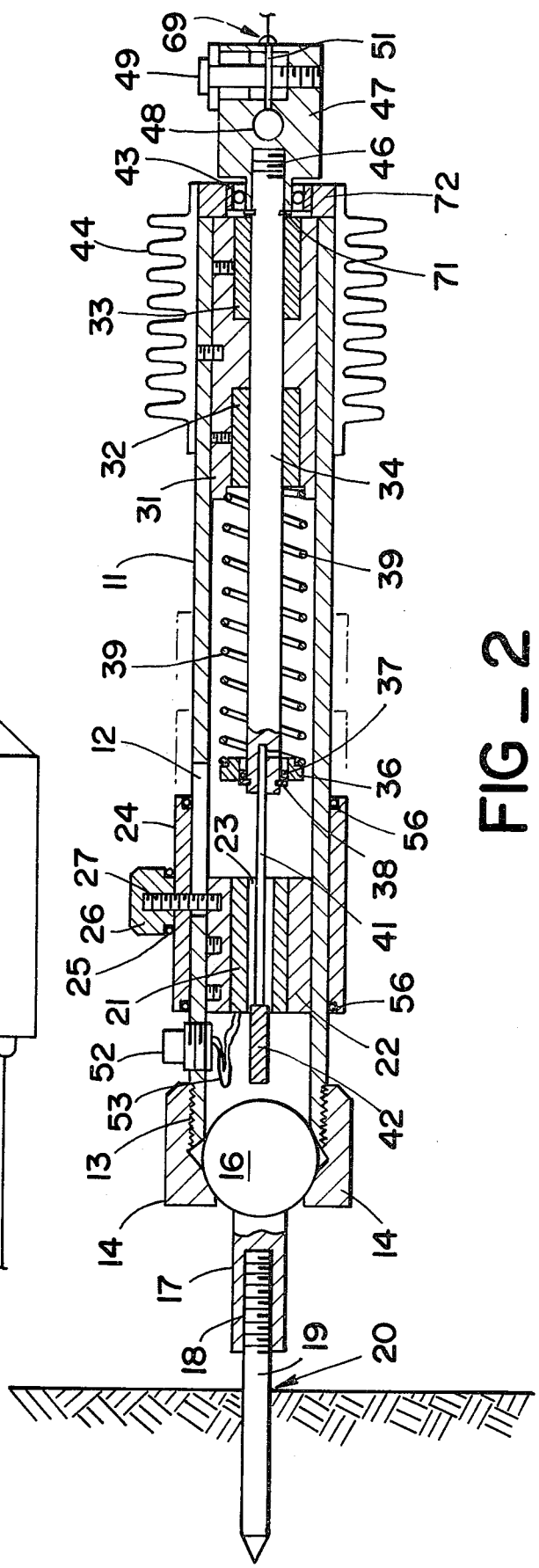

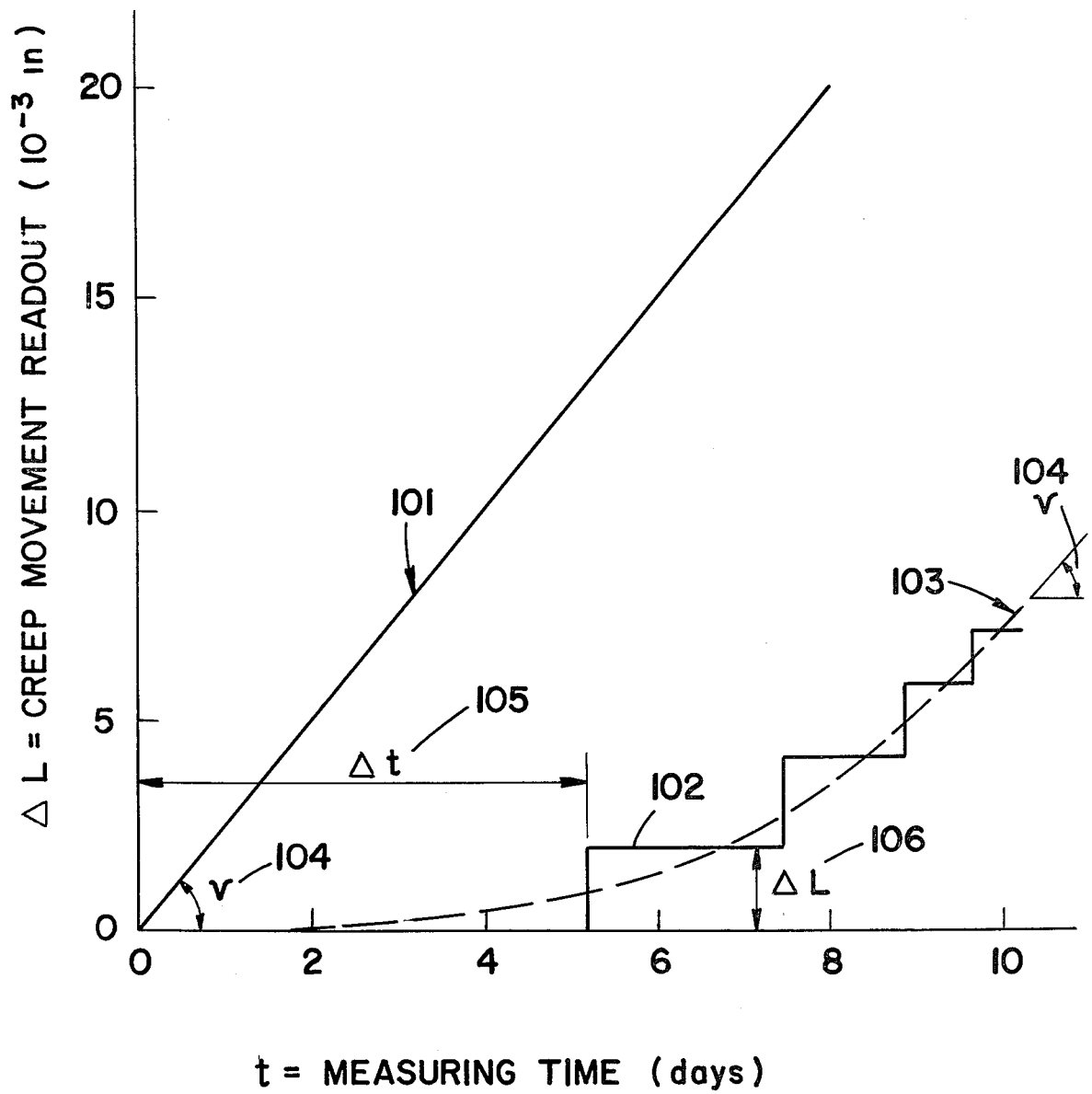
FIG_3

MICRO-CREEPMETER

BACKGROUND OF THE INVENTION

In the general field of earth structures such as open pit slopes, tailings dams, foundation work, tunnel excavations, underground mines, and the like, it is well known that stresses within the earth media surrounding the structure or within the structure may exceed the structure's strength and cause a failure. If there is no warning of such a failure, the consequences may be catastrophic, especially in terms of the loss of lives of workers caught in a collapsing structure.

It is known, at least theoretically, that such failures do not occur without tell-tale prior warning signals. That is, as the stresses within an earth structure approach the critical maximum strength of the earth materials, the structure beings to deform or creep long before failure. Although the velocity of such creep deformation is quite small compared with the movement which occurs during a failure, it can be measured. Measurement of the magnitude and direction of the microscopic creep velocity discloses the nature and cause of the potential failure. With quantitative knowledge of the micro-creep behavior, the potential failure may be predicted, and consequently, necessary measures may be taken to avert such a failure. The technological realization of this theoretical knowledge has been less than optimum to date, as witnessed by the many mine cave-ins, slope failures, and the like, throughout the world. This is due in part to the fact that the micro-creep velocity prior to failure is quite small. Existing state-of-the-art devices for measuring creep have a limited sensitivity, and require a rather long time period to develop significant data regarding the nature and magnitude of the ground creep velocity. In situations such as advanced tunnel excavations or underground mining, or open pit mining, the prior art creep measuring devices cannot be set up for a sufficient time to gain significant data, as they commonly interfere with construction or mining activity. Economic considerations dictate that these devices will be set aside in favor of maintaining mine output or excavation progress.

SUMMARY OF THE PRESENT INVENTION

The present invention generally comprises a creepmeter of novel construction which yields creep displacement measuring resolution several orders of magnitude greater than any prior art device. The resolution and stability of the present invention is sufficient to allow a direct readout or recording of micro-creep velocity between two measuring points with maximum accuracy in the order of $10^{-6}$ inches per minute immediately after installation of the device. Effective use of the present invention will develop significant creep velocity data within a time period on the order of ten minutes after installation, particularly in underground application where thermal disturbance is minimal. Thus it will cause little or no interference with the work in progress.

The device includes a generally cylindrical housing anchored to a measuring point by a multi-directional ball joint fitting which is adapted for quick installation. A linear variable differential transformer is disposed within the cylindrical housing, and a piston slidably disposed within the housing supports a transformer core which translates through the sensing field of the transformer. A piston rod extending axially out of the cylindrical housing is secured to the other measurement point by a dual wire connection. In this arrangement, the dual wire also acts as a temperature sensing filament for electronic compensation of temperature effects.

A set of four ball bearings support the piston rod within the housing, to virtually eliminate any friction associated with axial and rotational movements. A helical compression spring disposed within the housing impinges upon the spring holder of the piston rod and biases the piston rod to withdraw into the housing, simultaneously applying a predetermined tension to the measuring wire. Two identical axial ball bearings interposed between the cylindrical housing and the piston rod eliminate friction in the axial movement. Any rotational friction effect due to compression or relaxation of the helical spring is removed by a rotary ball bearing mounted on the spring holder at the inner end of the piston rod. Rotational friction between the external seal plate and the piston rod is removed by environmentally sealed rotary ball bearings. A highly flexible bellows seal is mounted to cover the variable gap between the external seal plate and the outer end of the cylindrical housing. This movable external seal, consisting of the bellows and the plate, protects the interior of the device from dirt, water, or other contamination, enabling the device to be used in most adverse field conditions, including a submerged condition.

BRIEF DESCRIPTION OF THE DRAWINGS

FIG. 1 is a plan view of the micro-creepmeter of the present invention, shown in its operational configuration in the field.

FIG. 2 is a longitudinal cross-sectional view of the micro-creepmeter of the present invention.

FIG. 3 is a graphical depiction of the response charcteristics of the creep measuring device of the present invention.

DESCRIPTION OF THE PREFERRED EMBODIMENT

With reference to FIG. 2, the micro-creepmeter of the present invention generally includes a cylindrical housing 11, which is provided with an axially extending slot 12 in the medial portion thereof. The end 13 of the cylindrical housing 11 is provided with threads which receive a similarly threaded end cap 14. A ball 16 is secured between the ends 13 of the housing and the end cap 14, and a rod 17 extends from the ball. The rod 17 is provided with a threaded hole 18 in which an anchoring stake 19 is secured. The anchoring stake 19 may be driven into the wall 20 of the solid structure by a hammer or by an explosive device.

Disposed within the cylindrical housing and adjacent to the end 13 is a linear variable differential transformer 21. The transformer 21 is provided with an axially extending bore 23. The transformer is supported within an annular transformer housing 22 which is slidably disposed in the housing 11.

Slidably disposed about the housing 11 is an annular adjustment collar 24, which is located in the general region of the transformer 21. A threaded shaft 27 extends radially outward from the transformer housing 22, through the slot 12, and a hole in the collar 24. An adjustment knob 26 is secured about the distal end of the threaded rod 27. It may be appreciated that as the adjustment collar 24 is translated axially about the housing 11, the transformer housing 22 and the transformer 21 are translated the same amount within the housing. The adjustment collar 24 is provided with a pair of O-ring seals 56 at the opposed ends thereof. Also, the adjustment knob 26 is provided with an O-ring 25 at the inside face of the knob.

Adjacent to the treaded end 13 of the housing 11, an electrical connector 52 extends through the wall of the housing. A set of wires 53 extend from the connector 52 to the linear variable differential transformer 21. It should be noted that the wires 53 are provided with sufficient slack to permit selective positioning of the transformer and its housing along the axis of the housing 11, as will be explained in the following.

Disposed within the other end portion of the housing 11 is an internal sleeve 31, which is held in place by set screws. The sleeve includes an axially extending bore therethrough and a pair of opposed annular recesses. A pair of axial motion ball bearings 32 and 33 are secured within the annular recesses of the sleeve 31. A piston rod 34 extends through the bore of the sleeve 31, and is supported by the axial motion ball bearings 32 and 33.

Secured about the inner end of the piston rod 34 is a spring holder 36, which is held in place by a retaining ring 38. Interposed between the spring holder 36 and the end of the piston rod is a rotary ball bearing 37. A helical compression spring 39 extends between the inner end of the sleeve 31 and the spring holder 36. It may be appreciated that any rotation of the inner end of the spring 39 occasioned by the compression or extension of the spring is not transferred to the piston rod, due to the action of the rotary ball bearing 37.

Extending coaxially from the inner end of the piston rod is a pin 41. A cylindrical transformer core 42 is joined to the distal end of the pin 41. Both the pin 41 and the core 42 are provided with sufficient clearance to translate freely within the bore 23 of the transformer 21.

The exterior end of the piston rod 34 is provided with a threaded portion 46, which engages a threaded hole in a wire fastening block 47. The block 47 includes a diametrical hole 48, and a diametrical slot 51 extending from the distal face of the block to the hole 48. A screw 49 is received in a threaded diametrical hole which is disposed perpendicularly to the slot 51. The block 47 is adapted to secure the two free ends on an anchor wire, as shown in FIGS. 1 and 2.

Adjacent to block 47 is disposed annular seal plate 72. Within the seal plate 72 is disposed an environmentally sealed rotary ball bearing 43, which is secured to piston rod 34 by means of retaining ring 71. A flexible bellows 44 is attached to housing 11 at one end and to the seal plate 72 at the other. It should be appreciated that this arrangement fulfills positively and effectively the two simultaneous requirements of eliminating any rotary friction between the piston rod and the external seal plate and sealing of the gap between the outer opening of the cylindrical housing and the external seal plate, without disturbing the delicate force-displacement equilibrium of the piston rod.

FIG. 3 graphically illustrates instrument creep movement readout response characteristics of creep measuring devices versus the time required to achieve such readout. The straight line 101 represents a typical micro-creep movement of an earth object moving with a rate of about 1 inch per year, or 2.74 milli-inches per day ($10^{-3}$ in/d), or 1.90 micro-inches per minute ($10^{-6}$ in/m). A readout response to this velocity of ground movement, from the most sensitive state of the art creep device, is represented by the stepped line 102. Over a period of days the line 102 approximates a reading represented by the broken line 103. The trend gradually approaches the true velocity value, $v$, 104, only after accumulating a large amount of creep deformation. At the same velocity of ground movement, the present invention responds within minutes with an accurate measure of the speed of movement as indicated by the straight line 101 which also represents the true creep movement of the ground with an accuracy in the order of $\pm 10^{-6}$ inches. It should be noted by comparing these two different response curves 101 and 102 that the conventional device cannot be applied for immediate velocity measurement because of the large initial response time 105, the microscopic friction jump 106, and the gradualness of the approach of the stepped response to the true velocity value 104 which are inherent in the mechanical construction of the prior art measuring probe. It may be appreciated that the present design overcomes this by eliminating the structural causes of these problems.

METHOD OF OPERATION

With reference to FIGS. 1 & 2, the micro-creepmeter of the present invention is used to determine the micro-creep velocity by measuring relative displacement between two separate points 20 and 60 on solid objects or points within an earthen structure, immediately after installation of the device. The points 20 and 60 may, for example, be on the opposed walls of a tunnel excavation, or on a single surface of open slope. First, the anchoring stake 19 is driven into the object 20 by means of a hammer or an explosive device. The rod 17 is then threaded on the stake 19 to secure the device to the object. The end cap 14 is tightened sufficiently to support the device firmly, while allowing the device to be rotated around the ball 16 in order to aim it accurately at the other measuring point 60.

Next, an anchoring pin 10 is driven into the object at measuring point 60, and a pulley 61 is secured to the anchoring pin 10. One end of a measuring wire 62 is mechanically secured at the point 69 of the wire fastening block 47. The other end of the wire 62 is passed through the pulley 61 and mechanically secured around the screw 49 of block 47. The wire 62 is pulled taut in alignment with the connected wire before being secured by squeezing the slot 51 with tightening of the screw 49, so that the piston rod 34 is almost fully withdrawn from the housing 11 and the spring 39 is compressed very closely to the desired predetermined loading. It may be appreciated that this installation process can be completed with simple tools. It should be noted that the wire 62 is electrically conductive and is formed of a metal alloy which exhibits a change in electrical resistance which is directly proportional to the temperature of the wire. It should be further noted that the points securing each end of the wire 62 are electrically insulated from each other and from the body of the device. Each of these wire endpoints is attached to one of the wires 64.

It may be appreciated that the conductive wire can provide a signal for effective temperature compensation of the measurement, minimizing effects caused by exposure of the wire to varying solar radiation and air turbulence. Such complex temperature effects on the measuring wire cannot be corrected properly by using ordinary localized temperature transducers, due to uneven temperature distribution over the measuring span. Thermal compensation may be unnecessary for underground applications where there are no thermal disturbances. In such cases, the double wire may be replaced by a single wire with minimum thermal expansion coefficient.

After installation of the device, it is necessary to mechanically adjust the position of the transformer 21 to a zero position in which the transformer core 42 is disposed within the central portion of the bore 23 of the transformer. This is accomplished by loosening the knob 26, and sliding the adjustment collar 24. The operator in the field is provided with a portable electronic indicator which connects to the plug 52 of the device, and which provides a meter reading indicative of the relative position of the transformer core 42 and the transformer 21. When that reading indicates that the core 42 and the transformer 21 are mechanically zeroed, the knob 26 is tightened to immobilize the transformer in the zeroed position. This manual procedure enables one to set the device within its most sensitive measuring range, within which the final measuring adjustment can be accomplished by electronic means. It should be appreciated that through a combined use of the mechanical and electronic zero settings the device can be quickly set up for the highest resolution measurement even under most adverse working conditions in the field.

Secured about the rod 17 is an electronic package 63 which includes circuitry for thermal compensation. This package is connected through wires 64 to the ends of the measuring wire 62. It is also connected through wires 66 and plug 52 to the linear variable differential transformer 22. The output of the device 63 is conducted through cable 67 to any suitable recording device.

The device 63 provides and receives the signals from the transformer 21 through the wires 66. Also, it sends a regulated current through the wires 64 and thus through the measuring wire 62. Any change in the voltage across the ends of the wire 62 is indicative of a change in resistance of that wire, which in turn in proportional to any thermal expansion or contraction of the wire 62. The device 63 generates a signal representing the change in length of the wire 62 due to thermal effects, and subtracts this signal from the micro-creep displacement signal originating in the transformer 21. The output of the device 63, which represents the actual displacement between the two measuring points 20 and 60, is then sent through cable 67 to a digital or chart recorder. The recorder provides a direct micro-creep velocity reading expressed in terms of $10^{-6}$ inches per minutes or the like. The recorder is also equipped with an auxiliary readout of cumulative displacement in terms of $10^{-6}$ inches or the like.

The electronic devices for accomplishing the signal processing described in the foregoing are well known in the electrical arts, and form no part of the present invention.

Due to the elegant and novel features of the microcreepmeter of the present invention, the device achieves an immediate reading of creep velocity with accuracies on the order of $10^{-6}$ in/min. in a matter of minutes of observation time, rather than days or weeks.

I claim:

1. A device for quickly determining micro-creep velocity by accurately measuring relative displacement between two objects, comprising a housing; a linear variable displacement transformer disposed within said housing; anchoring means for securing said housing to one of said objects, said transformer having translatable core means disposed within the sensing field of said transformer; and means for joining said transformer core means to the other of said objects, including a piston rod slidably disposed within said housing, said transformer core means extending from the inner end of said piston rod, and wire connection means including temperature compensating wire means extending between said piston rod and said other object.

2. The device of claim 1, further including a pulley wheel anchored to said other object, said temperature compensating wire means extending from the distal end of said piston rod, through said pulley wheel, and back to said distal end of said piston rod.

3. A device for quickly determining micro-creep velocity by accurately measuring relative displacement between two objects which can be connected by a metal wire, comprising a housing; a linear variable displacement transformer disposed within said housing; anchoring means for securing said housing to one of said objects, said transformer having translatable core means disposed within the sensing field of said transformer; means for joining said transformer core means to the other of said objects with a wire connection, and adjustment collar means secured in selectively axially positionable fashion about said housing, means for linking said adjustment collar means and said transformer, said transformer being likewise selectively positionable within said housing.

4. The device of claim 3, further including an axially extending slot disposed within said housing, said linking means extending through said axially extending slot.

5. The device of claim 3, further including O-ring means mounted in said adjustment collar means and about said housing for providing environmental protection for the interior of said housing.

6. A device for quickly determining micro-creep velocity by accurately measuring relative displacement with a resolution of 1 to 10 microinches between two objects which can be connected by a wire, comprising a housing; a linear variable displacement transformer disposed within said housing, said transformer having translatable core means disposed within the sensing field of said transformer; a piston rod slidably disposed within said housing, and extending partially therefrom, said translatable core means secured to the inner end of said piston rod, the other end of said piston rod secured to one of said objects by a wire, and anchoring means for securing said housing to the other of said objects, including an anchor member secured to said other object, and ball and socket means connecting said anchoring means and said housing, said housing being pivotable to align said piston rod with said wire.

7. A device for quickly determining micro-creep velocity by accurately measuring relative displacement with a resolution of 1 to 10 microinches between two objects which can be connected by a wire, comprising a housing; a piston rod slidably secured within said housing and partially extending therefrom, a wire connecting the outer end of said piston rod to one of said objects, first bearing means disposed within said housing and supporting said piston rod for alleviating axial friction therebetween; helical compression spring means disposed within said housing for axially biasing said piston rod to withdraw into said housing and apply tension to said wire; second bearing means disposed between said piston rod and said helical compression spring means for preventing transmission of torque attendant with axial flexure of said helical compression spring means to said piston rod; and transducer means within said housing for measuring axial displacement between said piston rod and said housing, said housing being secured to the other of said objects.

8. The device of claim 7, further including third bearing means, disposed between said housing and said piston rod, for relieving torque attendant with elastic extension of said wire.

9. The device of claim 8, further including an external seal plate secured about said outer end of said piston rod, said third bearing means disposed between said piston rod and said seal plate; and flexible bellows means extending between said housing and said seal plate for sealing the variable gap therebetween.

* * * * *